US012366397B2

(12) United States Patent
Stuffer et al.

(10) Patent No.: US 12,366,397 B2
(45) Date of Patent: Jul. 22, 2025

(54) DISPENSING ASSEMBLY FOR A SNOW GENERATOR AND SNOW GENERATOR COMPRISING SAID DISPENSING ASSEMBLY

(71) Applicant: DEMACLENKO IT S.R.L., Vipiteno (IT)

(72) Inventors: Florian Stuffer, Vipiteno (IT); Achim Frontull, Vipiteno (IT)

(73) Assignee: DEMACLENKO IT S.R.L., Vipiteno (IT)

( * ) Notice: Subject to any disclaimer, the term of this patent is extended or adjusted under 35 U.S.C. 154(b) by 460 days.

(21) Appl. No.: 17/777,226

(22) PCT Filed: Nov. 20, 2020

(86) PCT No.: PCT/IB2020/060975
§ 371 (c)(1),
(2) Date: May 16, 2022

(87) PCT Pub. No.: WO2021/100013
PCT Pub. Date: May 27, 2021

(65) Prior Publication Data
US 2022/0404085 A1 Dec. 22, 2022

(30) Foreign Application Priority Data
Nov. 22, 2019 (IT) ........................ 102019000021954

(51) Int. Cl.
*F25C 3/04* (2006.01)
*B05B 3/10* (2006.01)
(Continued)

(52) U.S. Cl.
CPC .............. *F25C 3/04* (2013.01); *B05B 3/1014* (2013.01); *B05B 3/1035* (2013.01); *B05B 7/0075* (2013.01); *B05B 7/061* (2013.01)

(58) Field of Classification Search
CPC ....... B05B 3/10; B05B 3/1014; B05B 3/1035; B05B 7/061; B05B 7/0075; F23C 3/00; F23C 3/02; F23C 3/04
(Continued)

(56) References Cited

U.S. PATENT DOCUMENTS 4,314,670 A 2/1982 Walsh
4,609,148 A * 9/1986 Gill .................... A01M 7/0028
239/224
(Continued)

FOREIGN PATENT DOCUMENTS

CN 206454833 U 9/2017
IT BZ20 120 007 A1 9/2013
PL 198 873 B1 7/2008

OTHER PUBLICATIONS

Notification Concerning Submission, Obtention or Transmittal of Priority Document for International Application No. PCT/IB2020/060975 dated Jan. 15, 2021.
(Continued)

*Primary Examiner* — Jason J Boeckmann
(74) *Attorney, Agent, or Firm* — Neal, Gerber & Eisenberg, LLP

(57) ABSTRACT

A dispensing assembly for a snow generator has a fixed structure having a circular opening extending along the longitudinal axis; a rotor extending along the longitudinal axis, which has one free end at the circular opening, and is configured to rotate around a rotational axis, preferably coinciding with the longitudinal axis; and a water supply assembly, configured to supply water at a given pressure within the fixed structure, at the free end of the rotor; the free end of the rotor being coupled to the circular opening of the fixed structure so as to delimit, together with the fixed structure, an annular gap configured to guide a jet of
(Continued)

atomized water towards the outside of the dispensing assembly.

16 Claims, 4 Drawing Sheets

(51) Int. Cl.
*B05B 7/00* (2006.01)
*B05B 7/06* (2006.01)

(58) Field of Classification Search
USPC ........................................ 239/14.2, 223, 224
See application file for complete search history.

(56) References Cited

U.S. PATENT DOCUMENTS

| | | | | |
|---|---|---|---|---|
| 6,378,778 | B1 * | 4/2002 | Lurås | F25C 3/04 239/14.2 |
| 6,994,278 | B2 * | 2/2006 | Galvin | B05B 1/28 239/14.2 |
| 2009/0220703 | A1 | 9/2009 | Woehr et al. | |
| 2011/0277685 | A1 | 11/2011 | Callendret et al. | |
| 2015/0175428 | A1 | 6/2015 | Heninger | |

OTHER PUBLICATIONS

International Search Report and Written Opinion for International Application No. PCT/IB2020/060975 dated Feb. 24, 2021.
Office Action for European Patent Application No. 20 828 111.3 dated Mar. 2, 2023 (4 pages).
Office Action for Chinese Patent Application No. 202080080190.6 dated Nov. 1, 2024 with translation (16 pages).

* cited by examiner

DISPENSING ASSEMBLY FOR A SNOW GENERATOR AND SNOW GENERATOR COMPRISING SAID DISPENSING ASSEMBLY

PRIORITY CLAIM

This application is a national stage application of PCT/IB2020/060975, filed on Nov. 20, 2020, which claims the benefit of and priority to Italian Patent Application No. 102019000021954, filed on Nov. 22, 2019, the entire contents of which are each incorporated by reference herein.

TECHNICAL FIELD

The present disclosure relates to a dispensing assembly for a snow generator for snow-making on ski runs of a ski area and to a snow generator comprising said dispensing assembly.

BACKGROUND

A ski area generally comprises a plurality of ski runs; artificial snow-making equipment arranged along the ski runs; and a fleet of snow groomers.

Artificial snow-making equipment and snow groomers are used to prepare the snow cover on ski runs. More precisely, artificial snow-making equipment produces programmed amounts of artificial snow to compensate for the lack of natural snow or, as appropriate, to guarantee constant snow quality, especially where it tends to wear away more quickly or, still further, to prepare artificial structures such as jumps, bumps, half-pipes and the like in the increasingly popular snow parks and fun parks.

In the last few decades, artificial snow-making equipment has become increasingly widespread to make up for the lack of natural snow on the ski runs.

Generally, artificial snow-making equipment comprises a plurality of snow generators arranged along the ski runs.

As is known, there are two types of generators widely used in ski areas: lance-type generators and fan-type generators.

Both types of generators comprise a plurality of first nozzles, which emit jets of atomized water, and a plurality of second nozzles, which emit jets composed of a mixture of compressed air and water in the vicinity of the jets of atomized water.

The compressed air divides the water into relatively tiny drops, which in contact with the external environment, due to the sudden loss of pressure and the decrease in temperature, freeze and form relatively tiny ice particles that make up the nuclei of the artificial snow crystals.

When the water droplets of the jets of atomized water meet the ice particles, they adhere to the ice particles and freeze, thereby forming an artificial snow crystal.

Generally, the fan-type generator comprises a fan configured to diffuse the jet of atomized water and the jet of the mixture of compressed air and water into the external environment.

Currently known generators are unable to maintain the characteristics of the generated artificial snow constant following large variations in the climatic conditions of the external environment.

SUMMARY

One object of the present disclosure is to provide a dispensing assembly for a snow generator for snow-making on ski runs, which mitigates certain of the drawbacks of certain of the prior art.

According to the present disclosure, a dispensing assembly for a snow generator for snow-making on ski runs is provided; the dispensing assembly extending along a longitudinal axis and comprising: a fixed structure defining a circular opening extending along the longitudinal axis; a rotor extending along the longitudinal axis, which has one free end at the circular opening, and is configured to rotate around a rotational axis, such as coinciding with the longitudinal axis; and a water supply assembly, configured to supply water at a given pressure within the fixed structure, at the free end of the rotor; the free end of the rotor being coupled to the circular opening of the fixed structure so as to delimit, together with the fixed structure, an annular gap configured to guide a jet of atomized water towards the outside of the dispensing assembly. In this way, it is possible to emit a jet of atomized water for the generation of relatively higher quality snow compared to certain of the prior art.

In particular, the rotor is configured to rotate, such as around the longitudinal axis, at a rotation speed of the rotor; wherein the rotation speed of the rotor is adjustable. In this way, the size of the water droplets in the jet of atomized water can be changed relatively easily and readily by changing the rotation speed of the rotor.

In greater detail, the dispensing assembly comprises a motor coupled to the rotor to drive the rotation of the rotor such as around the longitudinal axis.

The motor enables the rotation speed of the rotor to be controlled in a relatively simple way.

In particular, the free end of the rotor is of a truncated cone shape. In this way, the rotation of the rotor causes, due to the effect of the centrifugal force, the emission of a conical jet of atomized water.

In particular, the rotor is mobile along a direction substantially coincident with or parallel to the longitudinal axis with respect to the fixed structure. In this way, the size of the annular gap can be varied in order to control the flow rate of the atomized water jet emitted through the annular gap based on the pressure of the water entering the generator.

Accordingly, the flow rate of the atomized water jet can be adjusted in order to maintain the characteristics of the generated snow constant in wide ranges of climatic conditions. In other words, it is possible to generate snow with substantially unchanged characteristics in widely different climatic conditions.

The term substantially coincident with or parallel to the longitudinal axis, with reference to the direction of movement of the rotor, is intended to mean a maximum angle of 20° between the direction of movement of the rotor and the longitudinal axis.

In certain embodiments, the maximum angle allowed between the direction of movement of the rotor and the longitudinal axis is 10°.

In another embodiment, the maximum angle allowed between the direction of movement of the rotor and the longitudinal axis is 5°.

In another embodiment, the direction of movement of the rotor coincides with the longitudinal axis. In particular, the dispensing assembly comprises a moving assembly for moving the rotor; the moving assembly comprising a hollow shaft, and an actuator configured to drive the hollow shaft in a direction parallel to the longitudinal axis; the rotor being inserted at least partially inside the hollow shaft and being coupled to the hollow shaft so as to rotate around the longitudinal axis independently of the hollow shaft and so as to move in the direction parallel to the longitudinal axis together with the hollow shaft; such as wherein the moving assembly comprises a bearing assembly; the rotor and the hollow shaft being coupled via the bearing assembly. In this way, the rotor can rotate around the longitudinal axis while the rotor is moved along a direction parallel to the longitudinal axis with respect to the fixed structure.

Furthermore, the bearing assembly enables the rotation of the rotor around the longitudinal axis to be uncoupled from the rotation of the hollow shaft around the longitudinal axis in a relatively simple way. In other words, the rotor and the hollow shaft are configured to move integrally with each other along a direction parallel to or coincident with the longitudinal axis and to rotate independently of each other around the longitudinal axis.

In particular, the moving assembly comprises an annular body, which is fixed to the fixed structure and has a threaded inner surface; a first gear wheel, fixed to the hollow shaft so as to rotate around the longitudinal axis together with the hollow shaft; and a second gear wheel, which engages with the first gear wheel and is controlled by the actuator; a portion of the outer surface of the hollow shaft being threaded so as to couple with the threaded inner surface of the annular body; with the actuator controlling the rotation of the second gear wheel. In other words, the actuator controls the screwing of the hollow shaft into the annular body, causing the movement of the hollow shaft and the rotor along a direction parallel to or coincident with the longitudinal axis. In this way, the size of the annular gap can be changed in a relatively simple and rapid way.

In particular, the hollow shaft is configured to screw into the annular body so as to move the rotor in a direction coincident with or parallel to the longitudinal axis.

In particular, the fixed structure comprises a body and a bracket fixed to the body at the free end of the rotor so as to delimit the annular gap together with the free end of the rotor. In this way, the size of the circular opening of the fixed structure and the size of the annular gap can be defined accurately.

A further object of the present disclosure is to provide a snow generator for snow-making on ski runs, which alleviates certain of the drawbacks of certain of the prior art.

In accordance with the present disclosure, a snow generator for snow-making on ski runs is provided; the generator comprising the dispensing assembly as previously described, and an emission assembly configured to emit at least one jet of a mixture composed of compressed air and drops of water at the jet of atomized water; in particular, so as to emit the jet of the mixture in a direction incident to the jet of atomized water.

In greater detail, when the drops of water of the mixture come into contact with the external environment, they freeze and form relatively tiny ice particles, enabling the drops of atomized water to adhere to the ice particles. This facilitates the nucleation of artificial snow crystals.

In particular, the emission assembly comprises at least one nozzle coupled to the fixed structure near the annular gap, and an air supply assembly, configured to supply compressed air to the at least one nozzle; the water supply assembly being configured to supply water at a designated or given pressure to the at least one nozzle; the at least one nozzle being configured to mix the compressed air and the water and emit the jet of the mixture at the jet of atomized water.

The at least one nozzle enables or otherwise allows the jet of the mixture to be emitted near the annular gap in order to increase the chances that the drops of atomized water will adhere to the ice particles and promote the nucleation of the artificial snow crystals.

In particular, the at least one nozzle extends in an inclined direction with respect to the longitudinal axis so as to emit the jet of the mixture in a direction incident to the jet of atomized water. This enables the jet of the mixture to be emitted at a reduced angle of incidence with respect to the jet of atomized water, in order to favor the incidence between the jet of the mixture and the jet of atomized water.

In particular, the water supply assembly comprises a first chamber obtained inside the fixed structure and configured to contain water at a given pressure and to supply water to the annular gap and to the at least one nozzle. In this way, the first chamber serves as a reservoir that contains water and continuously supplies it at a given pressure both to the annular gap and the at least one nozzle.

In particular, the air supply assembly comprises a second annular chamber configured to contain compressed air and to supply compressed air to the at least one nozzle. In this way, the second chamber serves as a reservoir that contains air and continuously supplies it at a given pressure to the at least one nozzle.

In accordance with a first embodiment of the present disclosure, the generator comprises at least one dispensing assembly and a plurality of nozzles arranged around the at least one dispensing assembly; the generator being, in certain embodiments, of the lance type.

In particular, the lance-type generator comprises a single dispensing assembly.

In accordance with a second embodiment of the present disclosure, the generator comprises a tubular frame, which extends along a further longitudinal axis and supports at least one dispensing assembly and a plurality of nozzles arranged next to the at least one dispensing assembly; and a fan placed inside the tubular frame and configured to rotate inside the tubular frame, such as around the further longitudinal axis, so as to convey a flow of air incident with the jet of atomized water and/or with the jet of the mixture of compressed air and water. In this case, the generator is of the fan type.

In particular, the dispensing assembly extends along the further longitudinal axis and is arranged inside the tubular frame; such as, the generator comprises a support structure fixed to the inner wall of the tubular frame; the dispensing assembly, in certain embodiments, being supported by the support structure.

In accordance with a variant of the second embodiment, the generator comprises a plurality of dispensing assemblies arranged in a ring along one end of the tubular frame; the generator, in certain embodiments, comprising a plurality of nozzles, each of which is arranged next to at least one dispensing assembly.

BRIEF DESCRIPTION OF THE DRAWINGS

Further features and advantages of the present disclosure will be apparent from the following description of a non-limiting embodiment thereof, with reference to the Figures of the accompanying drawings, wherein.

DETAILED DESCRIPTION

Figure 1:
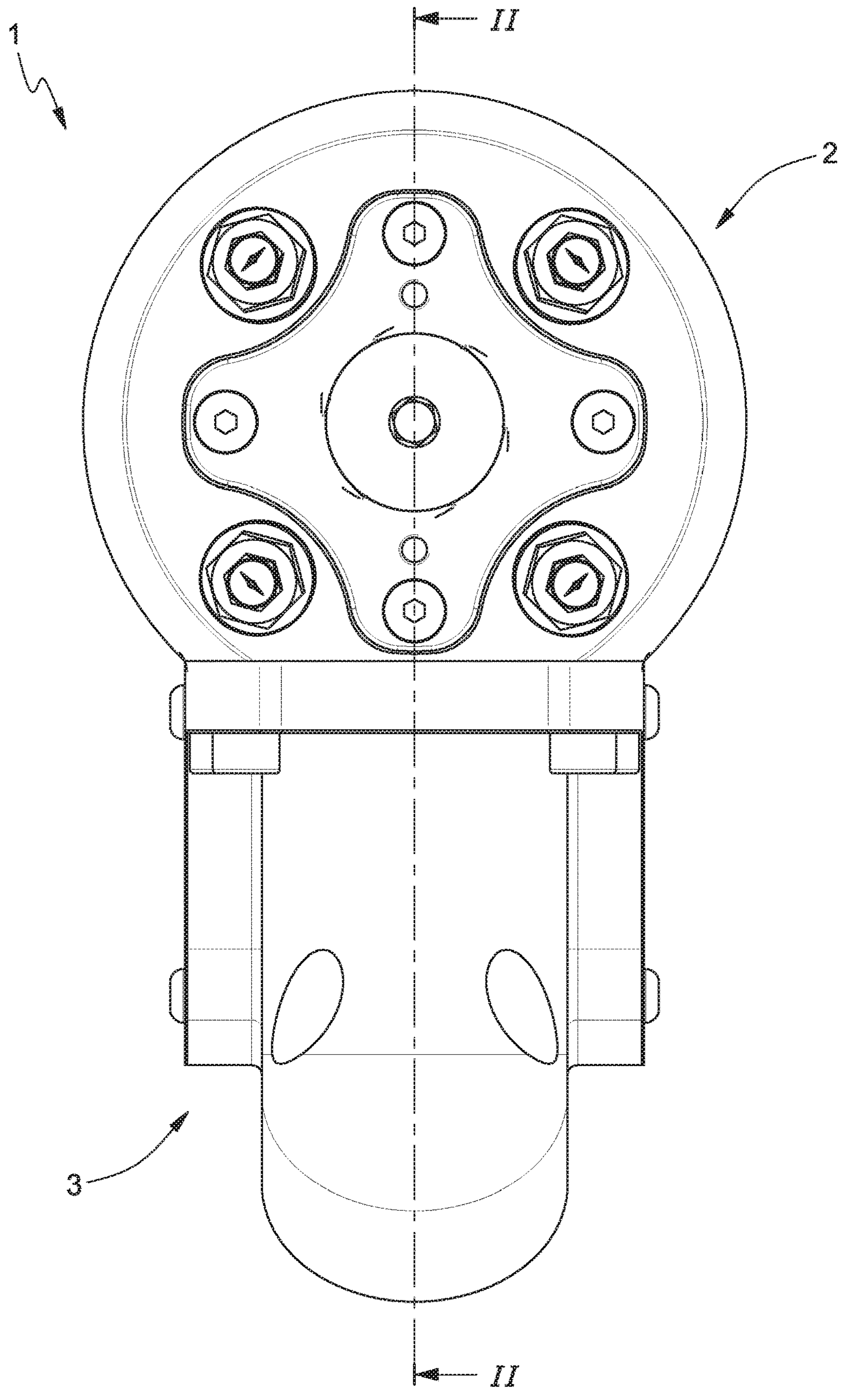
FIG. 1 is a front view, with parts removed for clarity and schematic parts, of a snow generator in accordance with a first embodiment of the present disclosure.
Figure 2:
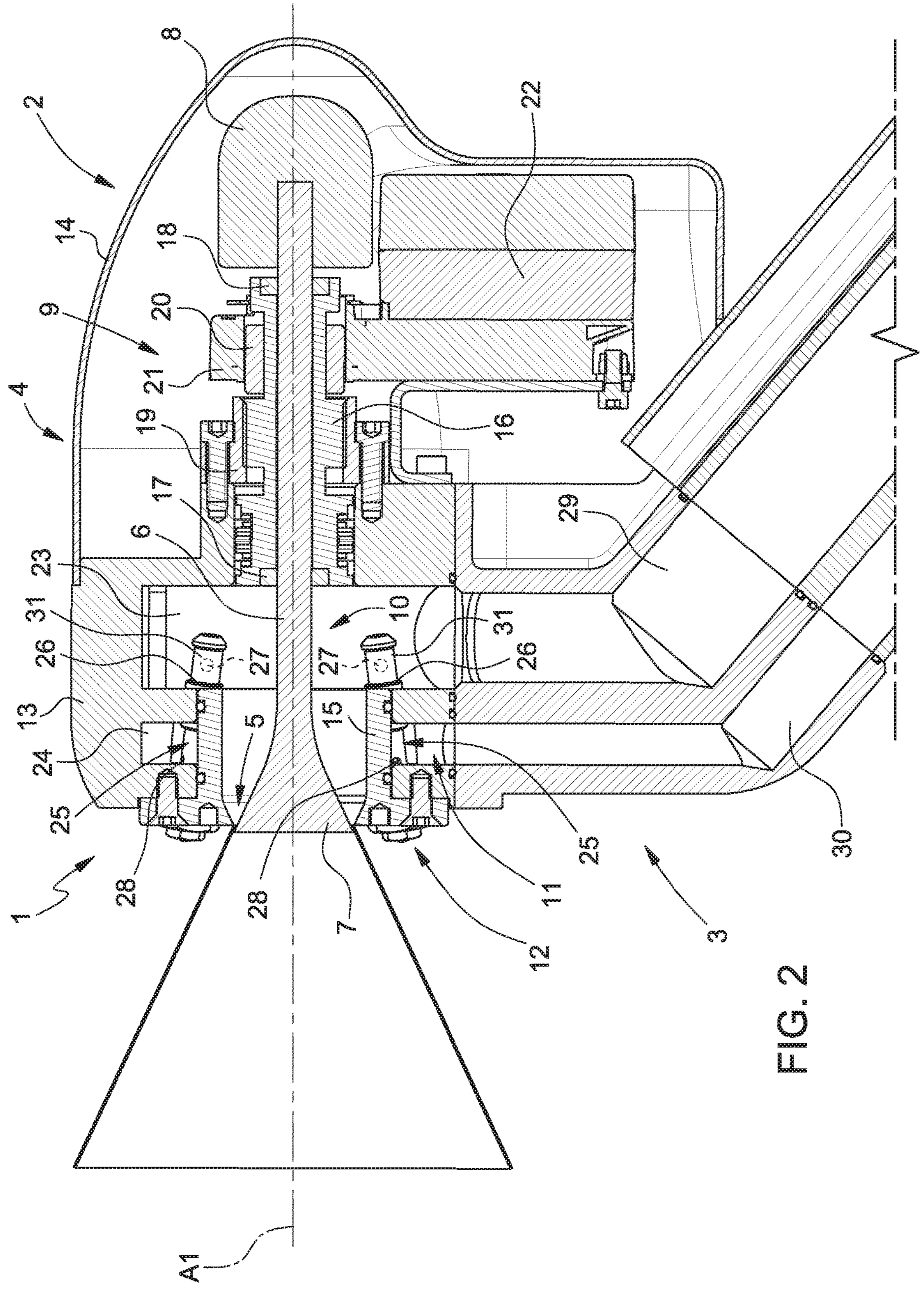
FIG. 2 is a sectional view, with parts removed for clarity and schematic parts, of the snow generator of FIG. 1 along the section lines II-II.

With reference to FIGS. 1 and 2, with 1 is indicated, as a whole, a snow generator.

In certain embodiments, the snow generator 1 is used for the generation of artificial snow for snow-making on ski runs, without thereby limiting the wide range of possible different applications of the present disclosure. In particular, the generator 1 is used as a lance-type generator.

The generator 1 comprises a dispensing assembly 2, which extends along a longitudinal axis A1, an emission assembly 12 configured to emit at least one jet of a mixture composed of compressed air and drops of water, and a supply and support structure 3 configured to supply the dispensing assembly 2 and the emission assembly 12 with pressurized water, compressed air and electrical energy, and to support the dispensing assembly 2.

The term "water" is intended to mean both the liquid commonly present in a natural basin and the liquid mixture formed by water and other substances dissolved in it.

With reference to FIG. 2, the dispensing assembly 2 comprises a fixed structure 4 having a circular opening 5 extending along the longitudinal axis A1; a rotor 6 arranged along the longitudinal axis A1, which has one free end 7 of a truncated cone shape at the circular opening 5 and is configured to rotate around the longitudinal axis A1; a motor 8, such as electric, to control the rotation of the rotor 6 around the longitudinal axis A1; a moving assembly 9 configured to move the rotor 6, configured to move the rotor 6 in a direction parallel to the longitudinal axis A1; and a water supply assembly 10.

The fixed structure 4 comprises a body 13, which has the circular opening 5; a cover 14, such as made of plastic material and arranged around the rotor 6 and the moving assembly 9 to protect the rotor 6 and the moving assembly 9 from external agents; and a bracket 15, which is fixed to the body 13, has an annular portion arranged inside the circular opening 5, and is arranged around the free end 7 of the rotor 6 so as to form, together with the free end 7 of the rotor 6, an annular gap.

In accordance with a variant of the present disclosure, the cover 14 is made of metallic material, such as aluminum.

The moving assembly 9 comprises a hollow shaft 16, inside which the rotor 6 is partially arranged; two bearings 17 and 18 arranged between the rotor 6 and the hollow shaft 16 in order to uncouple the rotation of the rotor 6 from the rotation of the hollow shaft 16; an annular body 19, which is fixed to the body 13 of the fixed structure 4 and has a threaded inner surface; a gear wheel 20, fixed to the hollow shaft 16 so as to rotate around the longitudinal axis A1 together with the hollow shaft 16; a gear wheel 21, which engages with the gear wheel 20; and an actuator 22, such as an electric motor, configured to control the rotation of the gear wheel 21.

A portion of the outer surface of the hollow shaft 16 is threaded so as to couple with the threaded inner surface of the annular body 19.

In accordance with alternative embodiments of the present disclosure (not shown in the drawings), the moving assembly 9 can assume different configurations from the case shown in FIG. 2.

By way of example, the rotor 6 can be moved along a direction parallel to the longitudinal axis A1 by a linear actuator, in particular a hydraulic cylinder.

The water supply assembly 10 comprises a chamber 23, which is obtained inside the fixed structure 4 and delimited by the walls of the body 13, by a wall of the bracket 15 facing the circular opening 5, by one end of the hollow shaft 16 and by the free end 7 of the rotor 6, which is partially arranged inside the chamber 23.

The chamber 23 communicates with the external environment through the annular gap and is configured to contain water at a given pressure and supply the water to the annular gap.

In accordance with an alternative embodiment of the present disclosure (not shown in the drawings), the water supply assembly 10 comprises a supply duct having one end arranged near the annular gap to supply water at a given pressure directly to the annular gap.

The emission assembly 12 comprises an air supply assembly 11 and four nozzles 25 arranged around the annular gap, for the emission of jets of a mixture of compressed air and water.

The compressed air supply assembly 11 comprises an annular chamber 24, which is obtained inside the fixed structure 4, is delimited by the walls of the body 13 of the fixed structure 4 and by a wall of the bracket 15, and is configured to contain air at a given pressure.

Each nozzle 25 is coupled to the fixed structure 4 near the annular gap and extends in an inclined direction with respect to the longitudinal axis A1.

The number of nozzles 25 may vary depending on the particular needs and does not limit the scope of protection of the present disclosure.

Each nozzle 25 comprises a tubular body 26, which has a first portion arranged inside the chamber 23 and a second portion arranged inside the chamber 24.

In greater detail, the first portion of the tubular body 26 has an opening 27 for the introduction of water into the tubular body 26 and a filter 31 arranged around the first portion of the tubular body 26 at the opening 27.

The second portion of the tubular body 26 has an opening 28 for the introduction of compressed air into the tubular body 26.

In accordance with a variant of the present disclosure, the nozzle 25 has a plurality of openings 27 and 28.

The supply and support structure 3 comprises a water supply duct 29, in fluidic communication with the chamber 23, and a compressed air supply duct 30, in fluidic communication with the chamber 24.

Figure 3:
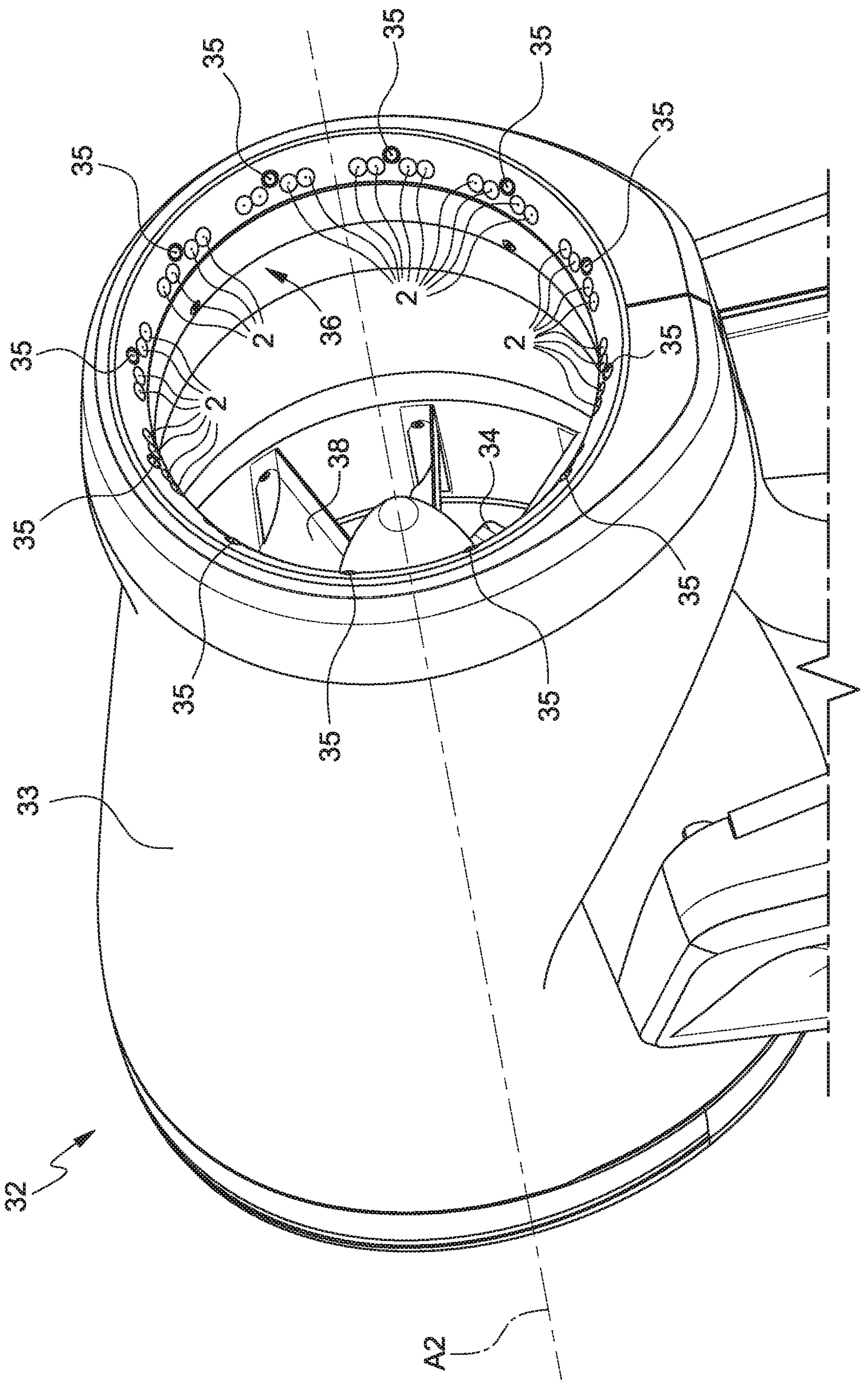
FIG. 3 is a perspective view, with parts removed for clarity and schematic parts, of a second embodiment of the snow generator of FIG. 1, in accordance with the present disclosure.

With reference to FIG. 3, 32 indicates, as a whole, a snow generator in accordance with a second embodiment of the present disclosure.

The generator 32 is used for the generation of artificial snow for snow-making on ski runs, without thereby limiting the wide range of possible different applications of the present disclosure. In particular, the generator 32 is used as a fan-type generator or a snow cannon.

The generator 32 is provided with a blower, which comprises a tubular frame 33 extending along a longitudinal axis A2; a support structure 38 fixed to the inner wall of the tubular frame 33; a fan 34, which is arranged inside the tubular frame 33, is supported by the support structure 38, and is configured to rotate around the longitudinal axis A2; a plurality of dispensing assemblies 2 supported by the tubular frame 33 and arranged in a ring along one end of the tubular frame 33; and an emission assembly 36 supported by the frame 33 and comprising a plurality of nozzles 35, each of which is configured to emit a jet of a mixture of compressed air and water and is arranged next to at least one dispensing assembly 2 associated therewith.

In greater detail, each dispensing assembly 2 and the respective emission assembly 36 associated therewith are arranged in respective openings formed in the tubular frame 33 so as to direct the jet of atomized water and the jet of the mixture of compressed air and water in directions incident to each other and transverse to the longitudinal axis A2.

The fan 34 is configured to convey a flow of air incident to the jets of atomized water and of the mixture of compressed air and water in order to increase the range and facilitate the mixing of said jets.

Figure 4:
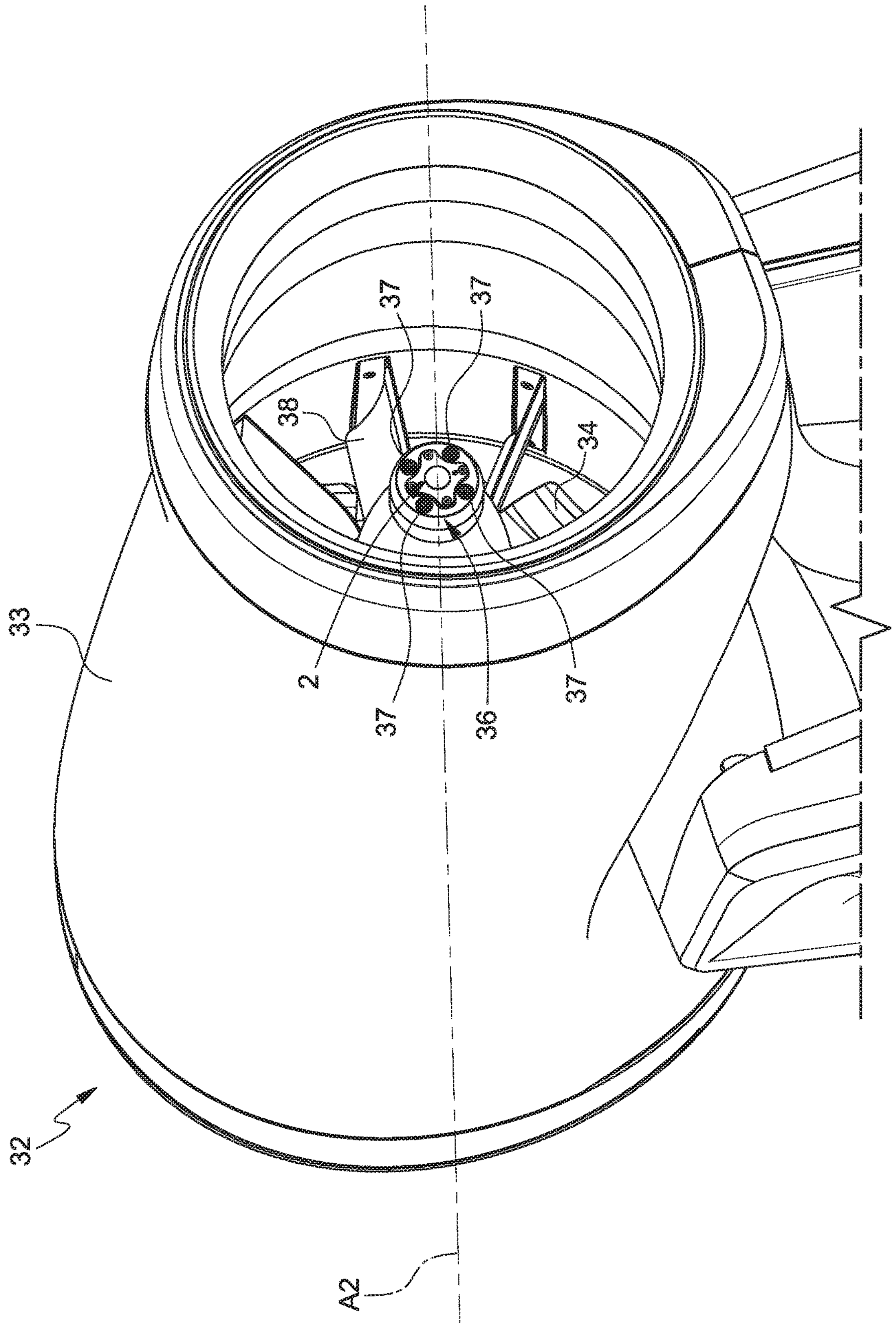
FIG. 4 is a perspective view, with parts removed for clarity and schematic parts, of a variant of the second embodiment of the snow generator of FIG. 1.

With reference to FIG. 4, a variant of the second embodiment is shown, in which the generator 32 comprises a single dispensing assembly 2, which is arranged inside the tubular frame 33, is supported by the support structure 38, and extends along the longitudinal axis A2; and a plurality of nozzles 37, which are arranged inside the frame 33 around the dispensing assembly 2 and are supported by the support structure 38.

In accordance with a further variant of the second embodiment (not shown in the drawings), the generator comprises a plurality of dispensing assemblies 2 arranged in a ring along one end of the tubular frame 33 as well as a dispensing assembly 2 arranged inside the tubular frame 33 and extending along the longitudinal axis A2.

In accordance with a further alternative embodiment (not shown in the drawings), the emission assembly is omitted from the snow generator. In other words, the jet of the mixture of compressed air and water is emitted by an emission assembly external to the snow generator.

In use and with reference to FIG. 2, the water is supplied from the duct 29 to the chamber 23 at a given pressure.

The motor 8 controls the rotation of the rotor 6, whose free end 7, by turning, atomizes the water contained in the chamber 23 at the annular gap and emits a conical-shaped jet of atomized water guided by the annular gap towards the external environment.

The motor 8 is configured to vary the rotation speed of the rotor 6 in order to control the size of the drops of atomized water according to the particular needs.

The pressurized water inside the chamber 23 is supplied to each nozzle 25 through the respective opening 27.

The compressed air is supplied from the duct 30 to the chamber 24, and from the chamber 24 to each nozzle 25 through the respective opening 28.

The water and the compressed air are mixed inside each nozzle 25 to form a mixture.

The compressed air, by mixing with the water, splits the water into relatively tiny drops of water and then the mixture is emitted in the form of a jet from each nozzle 25, at the conical jet of atomized water.

Each nozzle 25 emits the jet of the mixture in a direction which is slightly inclined with respect to the conical jet of atomized water so that the jet of the mixture is incident to the jet of atomized water with a reduced angle of incidence.

When the drops of water of the mixture come into contact with the external environment they freeze in a relatively very short time, due to the rapid decrease in temperature and pressure, thus forming relatively tiny particles of ice. The drops of atomized water come into contact with the ice particles and adhere to the ice particles, enabling or otherwise allowing the nucleation of artificial snow crystals.

The moving assembly 9 controls the position of the rotor 6, and in particular of the free end 7, with respect to the circular opening 5 so as to vary the size of the annular gap in order to adjust the flow rate and pressure of the jet of atomized water according to the particular operational needs.

In greater detail, the actuator 22 controls the rotation of the gear wheel 21 which engages with the gear wheel 20 transmitting the rotation to the gear wheel 20, which, in turn, as it is keyed to the hollow shaft 16, transmits the rotation to the hollow shaft 16.

Accordingly, the actuator 22 controls the rotation of the hollow shaft 16 around the longitudinal axis A1.

By rotating, the hollow shaft 16 screws into the thread of the annular body 19, causing the hollow shaft 16 to move in a direction parallel to the longitudinal axis A1.

The rotor 6 moves in the direction parallel to the longitudinal axis A1 together with the hollow shaft 16 and, as it is coupled to the hollow shaft 16 via the bearings 17 and 18, rotates around the longitudinal axis A1 independently of the rotation of the hollow shaft 16 around the longitudinal axis A1.

Lastly, it is clear that the present disclosure can be subject to variations with respect to the embodiments described above without however departing from the scope of protection of the appended claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A snow generator dispensing assembly extending along a longitudinal axis and comprising:

a fixed structure extending along the longitudinal axis, the fixed structure defining a circular opening;

a rotor extending along the longitudinal axis and rotatable around a rotational axis, the rotor having a free end associated with the circular opening of the fixed structure to delimit, together with the fixed structure, an annular gap configured to guide a jet of atomized water towards an outside of the snow generator dispensing assembly, wherein the rotor is moveable, relative to the fixed structure, along a direction coincident with the longitudinal axis;

a water supply assembly configured to supply water at a designated pressure within the fixed structure towards the free end of the rotor; and a moving assembly configured to move the rotor, the moving assembly defining a hollow shaft and comprising:

an actuator configured to drive the hollow shaft in a direction coincident with the longitudinal axis, wherein the rotor is inserted at least partially inside the hollow shaft, coupled to the hollow shaft and configured to: rotate about the longitudinal axis independent of the hollow shaft, and move in the direction coincident with the longitudinal axis together with the hollow shaft;

an annular body fixed to the fixed structure and having a threaded inner surface;

a first gear wheel fixed to the hollow shaft and rotatable about the longitudinal axis together with the hollow shaft; and a second gear wheel engageable with the first gear wheel and controllable by the actuator to control a rotation of the second gear wheel, wherein a portion of an outer surface of the hollow shaft is threaded to be coupled with the threaded inner surface of the annular body.

2. The snow generator dispensing assembly of claim 1, wherein the rotor is rotatable at an adjustable rotation speed.

3. The snow generator dispensing assembly of claim 1, further comprising a motor coupled to the rotor and configured to drive the rotation of the rotor.

4. The snow generator dispensing assembly of claim 1, wherein the free end of the rotor defines a truncated cone shape.

5. The snow generating dispensing assembly of claim 1, wherein the moving assembly comprises a bearing assembly, and the rotor and hollow shaft are coupled via the bearing assembly.

6. The snow generator dispensing assembly of claim 1, wherein the hollow shaft is screwable into the annular body to cause the rotor to move in the direction coincident with the longitudinal axis.

7. The snow generator dispensing assembly of claim 1, wherein the fixed structure comprises:
- a body, and
- a bracket fixed to the body at the free end of the rotor to delimit the annular gap together with the free end of the rotor.

8. A snow generator comprising:
- a dispensing apparatus comprising:
  - a fixed structure extending along a longitudinal axis, the fixed structure defining a circular opening;
  - a rotor extending along the longitudinal axis and rotatable around a rotational axis, the rotor having a free end associated with the circular opening of the fixed structure to delimit, together with the fixed structure, an annular gap configured to guide a jet of atomized water towards an outside of the dispensing assembly, wherein the rotor is moveable, relative to the fixed structure, along a direction coincident with the longitudinal axis;
  - a water supply assembly configured to supply water at a designated pressure within the fixed structure towards the free end of the rotor; and
  - a moving assembly configured to move the rotor, the moving assembly defining a hollow shaft and comprising:
    - an actuator configured to drive the hollow shaft in a direction coincident with the longitudinal axis, wherein the rotor is inserted at least partially inside the hollow shaft, coupled to the hollow shaft and configured to: rotate about the longitudinal axis independent of the hollow shaft, and move in the direction coincident with the longitudinal axis together with the hollow shaft;
    - an annular body fixed to the fixed structure and having a threaded inner surface;
    - a first gear wheel fixed to the hollow shaft and rotatable about the longitudinal axis together with the hollow shaft; and
    - a second gear wheel engageable with the first gear wheel and controllable by the actuator to control a rotation of the second gear wheel, wherein a portion of an outer surface of the hollow shaft is threaded to be coupled with the threaded inner surface of the annular body; and
- an emission assembly configured to emit a jet of a mixture composed of compressed air and a drop of water at the jet of atomized water.

9. The snow generator of claim 8, wherein the emission assembly comprises a nozzle coupled to the fixed structure a first distance from the annular gap, and an air supply assembly configured to supply compressed air to the nozzle, wherein the water supply assembly is configured to supply the water at the designated pressure to the nozzle which is configured to mix the compressed air and the water and emit the jet of the mixture at the jet of atomized water.

10. The snow generator of claim 9, wherein the nozzle extends in an inclined direction relative to the longitudinal axis to emit the jet of the mixture in a direction incident to the jet of atomized water.

11. The snow generator of claim 9, wherein the water supply assembly comprises a first chamber inside the fixed structure and configured to contain water at a designated pressure and to supply water to the annular gap and to the nozzle.

12. The snow generator of claim 9, wherein the air supply assembly comprises an annular chamber configured to contain compressed air and to supply compressed air to the nozzle.

13. The snow generator of claim 8, further comprising a dispensing assembly, and a plurality of nozzles arranged around the dispensing assembly.

14. The snow generator of claim 8, further comprising a tubular frame extending along a further longitudinal axis and supporting a dispensing assembly, and a plurality of nozzles arranged next to the dispensing assembly, wherein a fan is located inside the tubular frame and rotatable inside the tubular frame to convey a flow of air incident with at least one of the jet of atomized water and the jet of the mixture of compressed air and water.

15. The snow generator of claim 14, wherein the dispensing assembly extends along the further longitudinal axis and is located inside the tubular frame.

16. The snow generator of claim 14, further comprising a plurality of dispensing assemblies arranged in a ring along one end of the tubular frame.

* * * * *